Nov. 15, 1949 W. A. CLEGERN 2,488,174
AIR FLOW INDUCING SYSTEM FOR AIR-COOLED
INTERNAL-COMBUSTION ENGINES
Filed Aug. 27, 1946 3 Sheets—Sheet 3
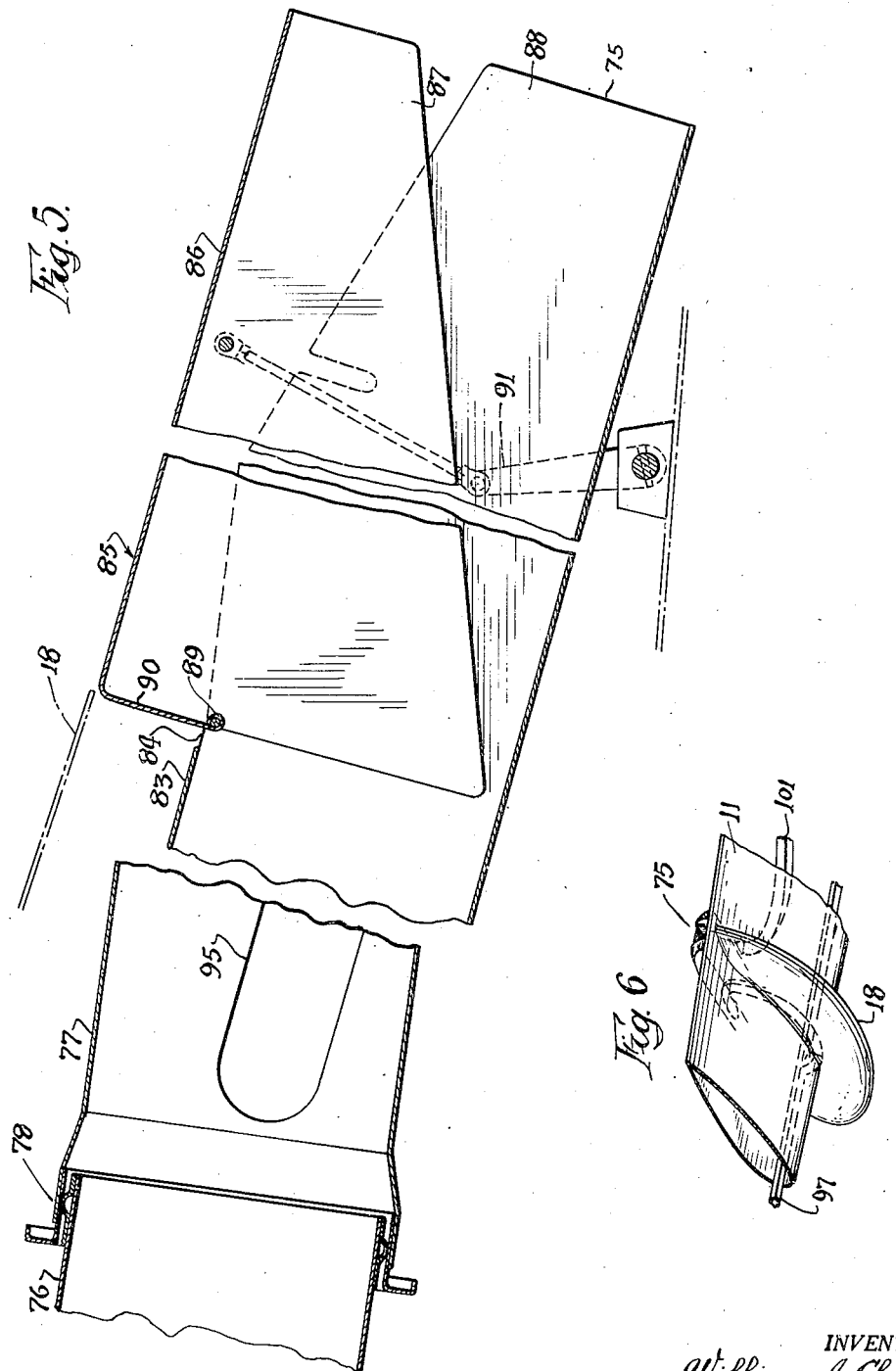
Witness:
Enes A. Campoun
INVENTOR.
William A. Clegern,
BY Walter J. Jason
ATTORNEY Patented Nov. 15, 1949

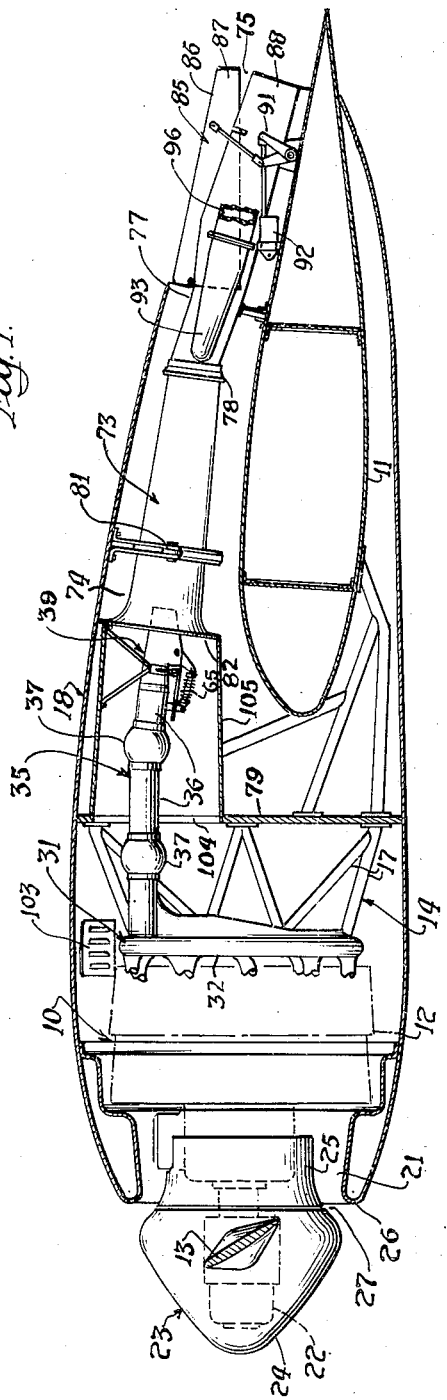

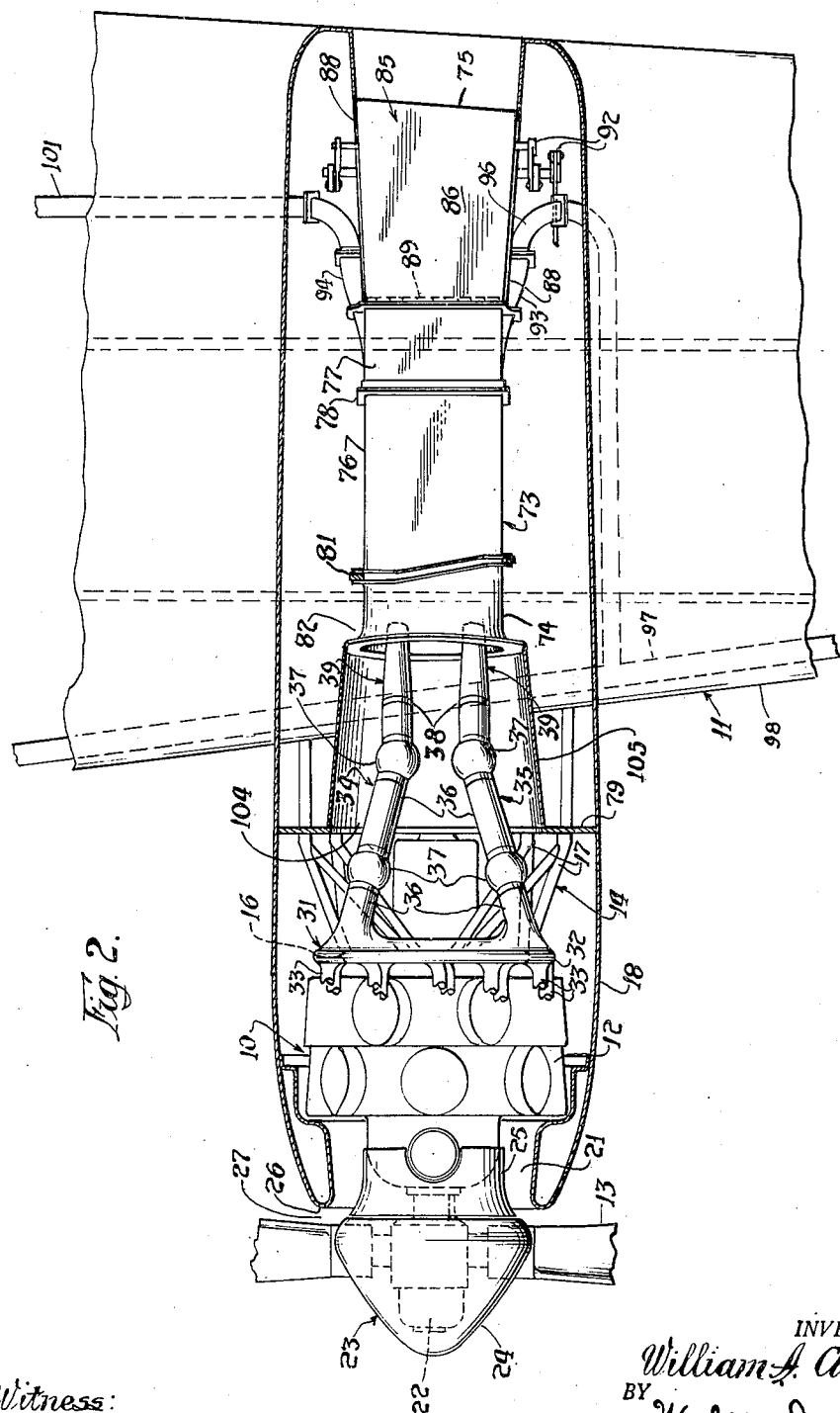

2,488,174

UNITED STATES PATENT OFFICE 2,488,174

AIR FLOW INDUCING SYSTEM FOR AIR-COOLED INTERNAL-COMBUSTION ENGINES

William A. Clegern, San Diego, Calif., assignor to Consolidated Vultee Aircraft Corporation, San Diego, Calif., a corporation of Delaware Application August 27, 1946, Serial No. 693,296

4 Claims. (Cl. 244—53)

This invention relates to power plants for aircraft and more particularly to an improved arrangement for cooling of the power plant and for augmenting the propulsive force provided by propellers driven by the power plant.

An object of the present invention is to provide in an airplane an improved system for cooling the engine while the airplane is in flight or on the ground.

Another object of the invention is to provide an improved cooling arrangement for an aircraft engine which will effect a reduction in the aerodynamic drag on the airplane.

Another object of the invention is to provide an improved cooling arrangement for an aircraft power plant embodying an air-tight cowling and a propeller spinner substantially closing the frontal opening therein.

Another object of the invention is to provide an improved cooling arrangement for an aircraft power plant embodying an air-tight nacelle closed except for a narrow annular opening therein through which air for cooling the power plant flows, the size of the opening being determined by a propeller spinner having a streamlined configuration, and apparatus for drawing the cooling air through the annular opening.

Another object of the invention is to provide in an aircraft an improved cooling arrangement for the power plant utilizing exhaust gases from the power plant for drawing cooling air over the power plant.

Another object of the invention is to provide an improved arrangement which utilizes the exhaust gases from the power plant for cooling the power plant and embodying means which at the same time are adapted to provide heated air for anti-icing purposes and for cabin heating.

Another object of the invention is to provide an aspirating system for drawing cooling air over the engine and embodying means adapted to automatically maintain a predetermined back pressure on the engine.

Another object of the invention is to provide an improved arrangement embodying an augmenter which utilizes the exhaust gases from the power plant to add to the propulsive force of the power plant.

Another object of the invention is to provide an improved cooling system for an engine embodying means for directing the exhaust gases into an augmenter and including means which will maintain maximum velocity of the exhaust gases entering the augmenter.

Other objects and features of this invention will be readily apparent to those skilled in the art from the following specification and appended drawings illustrating certain preferred embodiments in which:

Figure 1 is a side elevational view, with the cowl in cross section, which diagrammatically illustrates a power plant embodying a cooling and thrust augmenting system according to the present invention;

Figure 2 is a top plan view of the power plant;

Figure 3 is a detail view showing the nozzle means for controlling the velocity of the exhaust gases entering the augmenter;

Figure 4 is an end view of the nozzle means of Figure 3;

Figure 5 is a side elevational view, in cross-section, of the augmenter; and

Figure 6 is a view in perspective illustrating the nacelle and showing the take-off ducts for anti-icing and cabin heating.

The cooling and power augmenting system as exemplified in the drawings constitutes the preferred form of the invention. It is illustrated in connection with, and forming a part of, a power plant 10 adapted to propel an aircraft. The power plant 10 is supported upon a wing 11 and comprises an internal combustion engine 12, of conventional construction, which is connected to drive a propeller 13. A motor mount structure 14 comprising the usual mounting ring 16 and struts 17 supports the engine 12. An air-tight nacelle 18 encloses the engine 12 and its accessories. The nacelle 18 is of general streamline conformation and has a rearward taper terminating in an exit opening.

At the forward end of nacelle 18 there is provided a circular entrance opening 21. The propeller 13 carries at its hub 22 a spinner 23 comprising a forwardly tapered portion 24 having a generally conoidal shape, and a rearwardly extending portion 25, which latter is disposed within the entrance opening 21. It is noted that the spinner 23 continues the aerodynamic conformation of the nacelle 18 to thereby cut down form drag. The conoidal portion 24 of the spinner 23 is so spaced with relation to the leading edges 26 of cowling 18 as to form between it and the cowling an annular opening 27. The annular opening 27 is located in a region where the static pressure, when the airplane is in flight, is substantially zero. The spinner 23 serves as an air metering device and dependent on its shape and location relative to cowling 18 determines the amount of recovery of available ram air.

Disposed rearwardly of the engine 12 is an exhaust collector ring 31 of conventional design which includes an annular portion 32 and a plurality of individual short stacks or conduits 33, which stacks are bolted or secured in any well known manner to the outlets of the various cylinders. Two exhaust stacks 34 and 35 extend rearwardly from the upper part of annular portion 32 of collector ring 31. The exhaust stacks 34 and 35 comprise a plurality of sections 36 joined together by ball joints 37 and a slip joint 38, of conventional construction, which care for expansion and vibrational movement of the stacks. Suitable brackets are provided associated with the motor mount assembly 14 which support the exhaust stacks 34 and 35 within the nacelle. Each of the exhaust stacks 34 and 35 terminates in a nozzle portion 39 which serves to eject the exhaust gases at a high speed from the stacks.

The nozzles 39, as best shown in Figures 3 and 4, each embody a pivotally movable valve member 41. The bottom wall surface 42 of the stacks 34 and 35 is cut away as at 43 and the valve member 41 is fitted therein. The size of the exit openings 40 of the nozzles 39 are adapted to vary with the movement of the valve member 41 to thereby vary the speed of the exiting exhaust gases.

Each valve member 41 comprises a body portion 44 having a wall surface 45 with one end 46 thereof of arcuate form and with two side wall portions 47, in parallel, extending from the wall surface 45. These side walls 47, when valve member 41 is located within the interior of stacks 34 and 35, lie juxtaposed to the side walls 48 and 49 of the exhaust stacks. A generally triangular member 51 is affixed, as by welding, centrally within the body portion 44 and upon the wall 45. A pin 52 carried by the exhaust stack side walls 48 and 49 extends through the valve member side walls 47 and the apex of the triangular member 51 to pivotally mount the valve member 41 to the exhaust stack. As shown, the pivot 52 for valve member 41 lies spaced from the trail position, or the horizontal position the valve member 41 assumes when in full open condition. This is done to prevent flutter of the valve member. A second pin 53 carried adjacent the extreme end of the exhaust stack provides a stop to limit the pivotal movement of the valve member 41 in a clockwise direction, as viewed in Figure 3. Flanges 54 extending inwardly from the exhaust stack side walls provide stops which are engageable by an edge 55 of the arcuate portion 46 of valve member 41 to limit the pivotal movement of the valve member in the reverse direction. As shown in Figure 3 a portion of the bottom wall 42 of the exhaust stacks 34 and 35 adjacent the cut away portion 43 is inwardly bent as at 56 and the end of this inwardly bent portion 56 is reverse bent and formed into an arcuate shape, as at 61, conforming to the configuration of arcuate portion 46 of valve member 41, whereby the latter is adapted to slide upon arcuate portion 61 and maintain a sealing engagement therewith.

As is shown, an arm 62 of the triangular member 51 extends outwardly beyond the arcuate portion 46 of valve member 41. To the end of this arm 62 is pivotally affixed one end of an elongated tubular member 63, having an annular flange portion 64 which provides a spring seat for one end of a compression spring 65. Associated with tubular member 63 is a rod-like member 66 pivotally supported at one end by a bracket 67 depending from the bottom wall 42 of the exhaust stack. A collar-like member 68 on the rod-like member 66 provides a spring seat for the other end of the spring 65. The end of rod 66 is adapted to slidably fit or telescope into the tubular member 63. About these telescoping elements, 63 and 66, the compression spring 65 is disposed. A nut 71 is threadedly carried by the rod-like member 66 and is movable thereon to move collar 68 toward and away from tubular member 63 to provide an adjustment means for changing the compressive force of the spring 65.

A heat shield 72 is disposed between the spring 65 and the bottom wall 42 of the exhaust stack to protect the spring 65 from the heat of the exhaust gases traveling through the stack.

The pivotal valve members 41 disposed in the nozzle portions 39 of the stacks 34 and 35 are adapted to effect predetermined or scheduled back pressures on the engine 13 at which the engine efficiently operates. The value of this back pressure is determined by the amount of spring force being applied by the spring 65 to hold the valve member 41 biased in a counter-clockwise direction within the exhaust stack with which it is associated. To hold this back pressure in a scheduled condition a pre-determined balance is effected between the adjustable compressive spring 65 and the force of the exhaust gases striking the rear side of wall 45 of valve 41; as this force varies the valve member 41 will automatically move on its pivot to enlarge or restrict the size of the exit openings 40 of nozzles 39 and thereby insure that a predetermined back pressure is secured. With the back pressure held at a predetermined value the exhaust gases issuing from the engine 13 will exit out of the nozzle ends 39 of the exhaust stacks 34 and 35 as a jet and at a desired maximum velocity.

Disposed rearwardly of the exhaust stacks 34 and 35 and adapted to accept the ejected exhaust gases is an augmenter duct 73. The augmenter duct 73 is substantially elliptical in the area adjacent its forward end 74 and resolves into a substantially rectangular shape at its exit end 75. The augmenter duct 73 is comprised of two primary conduit sections 76 and 77 connected by a slip joint 78. The augmenter 73 is shock mounted against vibration as by shock mount 81. The forward end of the conduit section 76 is provided with a bell-mouth approach 82 which is disposed about the exit ends of exhaust stacks 34 and 35. As shown, the exhaust stacks 34 and 35 extend for a portion of their length within the augmenter 73. The augmenter 73 in conjunction with the exhaust stacks 34 and 35 and the variable area nozzles 39 carried thereby will induce a flow of cooling air over the engine 12, past a fire wall 79 and through the augmenter.

As best shown in Figure 5, the top wall 83 of the rearward end of conduit 77 is cut away as at 84. Located at this cut away portion 84 is a hingedly mounted diffuser flap member 85 which is adapted to control the flow of exhaust gases and air through the duct 73. The diffuser flap 85 is of generally channel shape comprising a top wall 86 and two parallel side wall portions 87 extending therefrom. The side walls 87 are disposed immediately adjacent side walls 88 of the augmenter duct 73.

The diffuser flap 85 is pivotally mounted at its forward end to the side walls 88 of the augmenter 73 as by a hinge 89, and in such a manner that the outer surface of top wall 86 provides a continuation of the enclosing wall of the cowling 18. With the use of a diffuser flap 85 it is readily seen that the area or size of the exit opening 75 of the duct 73 will be varied upon pivotal movement of the diffuser flap 85. The side walls 87 on the diffuser flap 85 disposed in juxtaposition to the side walls 88 of the augmenter duct 73 cooperate therewith to prevent the inflow of outside air into the duct 73 through cut away portion 84 in the top wall 83 of the augmenter 73 during pivotal movement of the diffuser flap. A flange 90 depending from wall 86 of the flap 85 is provided to block flow of air into the cut away portion 84. Thus it is seen that with the construction as described air and exhaust gases can only pass through or into the augmenter 73 by way of its frontal opening, and there will be no detraction from the propulsive effect obtained from the use of the augmenter 73.

For moving the diffuser flap 85 to vary the size of the exit opening 75 there is provided an electric actuator 92, of conventional design, mounted upon a wing 11 and connected through a linkage system 91 to the side walls 87 of the diffuser flap 85. The operator can, by a control switch (not shown), effect operation of the electric actuator 92 to move the diffuser flap 85 to any desired position and thereby control the flow of air through the augmenter 73.

As illustrated in the drawings, and particularly in Figure 2, the present invention includes structure for utilizing the heat of the exhaust gases for anti-icing and cabin heating purposes. This structure comprises a pair of take-off ducts 93 and 94 mounted on opposite sides of the augmenter 73 and upon the side walls 88 thereof. Openings 95 in side walls 88 lead to the take-off ducts. The take-off ducts 93 and 94 should open into the augmenter 73 at a point where the exhaust gases and the air are completely mixed to obtain full advantage of the heat of the exhaust gases. A conduit 96 is connected to take-off duct 93 and leads to and joins with a conduit 97 located at the leading edge 98 of the wings 11. Hot air can thus flow from the augmenter 73 through the conduit arrangement described and serve to prevent the formation of ice on the wings. A conduit 101 connects with the second take-off duct 94 and leads to the airplane cabin (not shown) or to other parts of the airplane where it can be utilized for heating purposes. Valves may be provided in the take-off ducts which are controllable by the pilot, to control the amount of hot air flowing therethrough or to completely shut off hot air flow. The diffuser flap 85 is also utilized to control the flow of hot air through the take-off ducts 93 and 94. Movement of the diffuser flap 85 to decrease the area of the exit opening 75 will raise the back pressure in the augmenter duct 73 and thereby cause additional air to flow into the take-off ducts 93 and 94.

Figure 1 illustrates flaps or gills 103 located adjacent the engine 12 which are normally closed while the engine 12 is operating but which are adapted to open when the engine 12 is stopped, as by means of a thermostatic control, not shown, to permit the escape of residual heat. The flaps 103 are never open during engine operation since adequate engine cooling is obtained through use of the invention herein described when the engine is running.

As shown, the exhaust stacks 34 and 35 are adapted to pass through an opening 104 in firewall 79. A shroud or tubular member 105 connects opening 104 with bell mouth 82 of augmenter 73 whereby air drawn over the engine 12 is channeled into the augmenter.

In the operation of the invention, with the engine 12 operating, the engine exhaust gases flowing through the exhaust stacks 34 and 35 will be ejected through the nozzles 39 thereof at high speed into the mouth of the augmenter 73. This ejection of the exhaust gases at high speed creates a high negative pressure in the region of the nacelle adjacent the mouth of the augmenter 73 and a suction or pumping effect is obtained which will draw cooling air from outside of the nacelle 18 in through the annular opening 27. This cooling air passes over the engine 12, cooling it in passing, and flows into and through the augmenter 73 and is evacuated through exit opening 75 aft of the nacelle 18. The forced evacuation of air and exhaust gases in a direction opposite to the line of flight of the airplane provides a jet thrust of appreciable magnitude. The diffuser flap 85 is operable to increase or decrease the area of the exit opening 75 of the augmenter duct 73 and thereby control the flow of air through the augmenter. The greater the area of the opening 75 the more the flow of air. Thus the pilot by checking the cylinder temperature and operating the diffuser flap 85 can effect the passage of that quantity of cooling air which will permit the operation of the engine 12, in flight, at its optimum temperature regardless of outside conditions.

With the present invention adequate cooling of the engine 12 is secured even while the airplane is on the ground, since air is pulled through the annular opening 27 and into the nacelle in quantities proportional to the engine power. The aspirating action of the exhaust increases as the amount of exhaust gases increase, and therefore engine cooling is proportional to engine power output.

The invention herein described in addition to providing an effective cooling system for the engine 12, while the airplane is in flight or on the ground, and affording additional thrust for augmenting the speed provided the airplane by the propeller provides a further advantage in that it permits for a different and improved construction of nacelle 18 over the customary type of nacelles. As is noted there are no cowl flaps utilized with the air-tight cowling 18 herein illustrated and therefore a source of drag has been eliminated. Further, utilizing a spinner 23, as described, which limits the size of the opening at the frontal end of the nacelle and permits the admission of only as much ram air into the interior of the nacelle as has been determined is required for efficient cooling of the engine while the airplane is in flight, eliminates high internal drag from the presence of too much cooling air (which is a consequence of the use of full ram air). This permits the nacelle to be made of lighter structural materials, thereby decreasing weight, because structural bursting loads within the nacelle are materially reduced if ram is reduced.

Another advantage derived from the use of the system of the present invention lies in the substantially complete elimination of noise which normally accompanies the use of jet equipment. It has been found that utilizing a variable area nozzle 39 as described reduces the noise level by shifting low frequency sounds to high frequency sounds, most of which are readily blanked out by the augmenter 73 and the nacelle structure and therefore do not enter the cabin of the airplane.

While certain preferred embodiments of the invention have been specifically disclosed it is understood that the invention is not limited thereto, as many variations will be readily apparent to those skilled in the art and the invention is to be given its broadest possible interpretation within the terms of the following claims.

I claim:

1. In a propeller driven aircraft, in combination, an internal combustion engine, a cowling enclosing said engine, air inducing means disposed within said cowling for drawing air from the exterior of said cowling and passing it over the engine for cooling thereof and comprising exhaust conduit means, variable area nozzle means associated with said exhaust conduit means for effecting ejection of the exhaust gases from the engine at high velocities and for automatically maintaining predetermined back pressures on said engine, an augmenter duct through which said high velocity gases pass to discharge into the air rearwardly of said cowling to provide a propulsive thrust and thereby augment the speed provided the airplane by the propeller, and duct means opening into said augmenter duct at a point spaced from the exit opening of said augmenter duct and into which heated air from said augmenter duct pass.

2. In a propeller driven aircraft, in combination, an internal combustion engine, a cowling enclosing said engine, air inducing means disposed within said cowling for drawing air from the exterior of said cowling and passing it over the engine for cooling thereof and comprising exhaust conduit means, variable area nozzle means associated with said exhaust conduit means for effecting ejection of the exhaust gases from the engine at high velocities and for automatically maintaining a predetermined back pressure on said engine, an augmenter duct through which said high velocity gases pass to discharge into the air rearwardly of said cowling to provide a propulsive thrust and thereby augment the speed provided the airplane by the propeller, duct means located in the leading edge of a wing of the aircraft, and conduit means interconnecting said augmenter duct and said wing leading edge duct means whereby heated air may pass from said augmenter duct to said leading edge duct means, said conduit means being connected to said augmenter duct at a point spaced from the exit opening of the augmenter duct and in an area where the exhaust gases and air are substantially completely intermixed.

3. In a propeller driven aircraft, in combination, an internal combustion engine, a cowling enclosing said engine, air inducing means disposed within said cowling for drawing air from the exterior of said cowling and passing it over the engine for cooling thereof and comprising exhaust conduit means, variable area nozzle means associated with said exhaust conduit means for effecting ejection of the exhaust gases from the engine at high velocities and for automatically maintaining predetermined back pressures on said engine, an augmenter duct through which said high velocity gases pass to discharge into the air rearwardly of said cowling to provide a propulsive thrust and thereby augment the speed provided the airplane by the propeller, duct means opening into said augmenter duct at a point spaced from the ends of said augmenter duct and in an area where the exhaust gases and air are substantially completely intermixed and into which heated air from said augmenter duct pass and a controllable outlet on said augmenter duct for regulating the flow of cooling air over the engine, and for increasing the flow of heated air into said duct means.

4. In a propeller driven aircraft, in combination, an internal combustion engine, a cowling enclosing said engine, air inducing means disposed within said cowling for drawing air from the exterior of said cowling and passing it over the engine for cooling thereof and comprising exhaust conduit means, variable area nozzle means associated with said exhaust conduit means for effecting ejection of the exhaust gases from the engine at high velocities and for automatically maintaining predetermined back pressure on said engine, an augmenter duct through which said high velocity gases pass to discharge into the air rearwardly of said cowling to provide a propulsive thrust and thereby augment the speed provided the airplane by the propeller, duct means located in the leading edge of a wing of the aircraft, conduit means interconnecting said augmenter duct and said wing leading edge duct means, whereby heated air may pass from said augmenter duct to said leading edge duct means, said conduit means being connected to said augmenter duct at a point spaced from the ends of said augmenter duct and in an area where the exhaust gases and air are substantially completely intermixed, and a controllable outlet on said augmenter duct for regulating the flow of cooling air over the engine, and for increasing the flow of heated air into said duct means.

WILLIAM A. CLEGERN.

REFERENCES CITED

The following references are of record in the file of this patent:

UNITED STATES PATENTS

| Number | Name | Date |
|---|---|---|
| 1,473,668 | Byrnes | Nov. 13, 1923 |
| 1,836,592 | Hammond | Dec. 15, 1931 |
| 1,847,093 | Martin | Mar. 1, 1932 |
| 2,048,399 | Loening | July 21, 1936 |
| 2,077,708 | Morse | Apr. 20, 1937 |
| 2,164,545 | Rogers | July 4, 1939 |
| 2,177,642 | Fellers | Oct. 31, 1939 |
| 2,221,905 | Berlin | Nov. 19, 1940 |
| 2,241,954 | Mercier | May 13, 1941 |
| 2,283,175 | Berger | May 19, 1942 |
| 2,303,992 | Frazer et al. | Dec. 1, 1942 |
| 2,356,452 | Fedden et al. | Aug. 22, 1944 |
| 2,372,250 | Burnelli | Mar. 27, 1945 |
| 2,388,247 | Berkow | Nov. 6, 1945 |
| 2,401,941 | Lee | June 11, 1946 |
| 2,410,856 | Koppen | Nov. 12, 1946 |
| 2,428,708 | Heftler | Oct. 7, 1947 |